United States Patent [19]

Hansford et al.

[11] Patent Number: 5,739,845
[45] Date of Patent: Apr. 14, 1998

[54] OPTICAL IMAGING ARRANGEMENT FOR USE WITH RADIATION SHIELDED ENCLOSURES

[75] Inventors: Stuart Hansford; Peter Stead, both of Cheshire, United Kingdom

[73] Assignee: British Nuclear Fuels plc, Cheshire, United Kingdom

[21] Appl. No.: 545,822

[22] PCT Filed: Mar. 13, 1995

[86] PCT No.: PCT/GB95/00534

§ 371 Date: Dec. 5, 1995

§ 102(e) Date: Dec. 5, 1995

[87] PCT Pub. No.: WO95/24720

PCT Pub. Date: Sep. 14, 1995

[30] Foreign Application Priority Data

Mar. 11, 1994 [GB] United Kingdom ............ 9404728

[51] Int. Cl.⁶ .................................................. H04N 7/18
[52] U.S. Cl. ............................................................. 348/83
[58] Field of Search ........................... 348/83; H04N 7/18

[56] References Cited

U.S. PATENT DOCUMENTS

| 3,229,577 | 1/1966 | Ellinger | 348/83 |
| 4,650,634 | 3/1987 | Meuschke | 348/83 |
| 4,876,593 | 10/1989 | Bauer | 348/83 |
| 5,028,379 | 7/1991 | Faulstich | 348/83 |
| 5,592,217 | 1/1997 | Hirvonen | 348/83 |

FOREIGN PATENT DOCUMENTS

| 899 927 | 6/1962 | United Kingdom . |
| 1 128 866 | 10/1968 | United Kingdom . |
| 1 270 030 | 4/1972 | United Kingdom . |
| 1 586 674 | 3/1981 | United Kingdom . |

*Primary Examiner*—Howard W. Britton
*Attorney, Agent, or Firm*—Nixon & Vanderhye P.C.

[57] ABSTRACT

An arrangement for forming an optical image of the interior of an enclosure contained within a radiation shield the enclosure being one in which remote handling operations are carried out on radioactive material and the shield having a passage therethrough from an outer end to an inner end at the said enclosure, which arrangement includes at or adjacent to the inner end of the passage optical guiding means for guiding optical radiation from scenes within the enclosure along a path through the said passage, located at or adjacent to the outer end of the passage deflection means for deflecting optical radiation which has been guided along the said path and a photodetector arranged outside the shielded enclosure and outside the radiation shield to receive optical radiation which has been deflected by the deflection means.

20 Claims, 1 Drawing Sheet

OPTICAL IMAGING ARRANGEMENT FOR USE WITH RADIATION SHIELDED ENCLOSURES

BACKGROUND OF THE INVENTION

1. Field of the Invention

The present invention relates to arrangements, especially optical imaging arrangements, for use in connection with ionising radiation shielded enclosures.

2. Discussion of Prior Art

The Applicants' prior specification no. GB 2186993A describes an arrangement for optically monitoring such an enclosure, eg an enclosure in which operations are carried out on irradiated nuclear fuel. The arrangement is expensive because of the need to provide extensive shielding around the optical components of the arrangement and the need to provide high precision radiation stable components, the arrangement being integral with the radiation shield of the enclosure.

SUMMARY OF THE INVENTION

According to the present invention in a first aspect there is provided an arrangement for forming an optical image of the interior of an enclosure contained within a radiation shield the enclosure being one in which remote handling operations are carried out on radioactive material for example nuclear fuel material during or after use in a nuclear reactor and the shield having a passage therethrough from an outer end to an inner end at the said enclosure, which arrangement includes at or adjacent to the inner end of the passage optical guiding means for guiding optical radiation from scenes within the enclosure along a path through the said passage, located at or adjacent to the outer end of the passage deflection means for deflecting optical radiation which has been guided along the said path and a photodetector arranged outside the shielded enclosure and outside the radiation shield to receive optical radiation which has been deflected by the deflection means.

The shield may comprise a concrete structure to protect the environment outside the enclosure from harmful radiation, eg β-rays, γ-rays and neutrons, emitted by materials in the enclosure. The passage may be formed through a wall, floor or roof of the concrete structure. The region outside the passage beyond the outer end of the passage may itself be contained within an outer radiation shield in which the deflection means may be enclosed. In such an arrangement, a cover may be provided to enclose the photodetector in order to prevent extraneous light from reaching the photodetector. In an alternative arrangement, the photodetector may also be enclosed within the outer radiation shield. The outer shield may comprise for example a heavy metal-containing material such as a material comprising lead or tungsten which absorbs harmful radiation which has travelled through the said passage. The passage itself may include a liner made of metallic material.

Advantageously, one or more passage diameter reducing elements made of radiation shielding material may be incorporated at suitable points along the passage to limit the amount of harmful radiation travelling through the passage and arriving at the outer radiation shield. The elements may be positioned such that they do not obstruct the path of the optical radiation travelling along the passage.

The optical guiding means may comprise a fixed or movable means. Desirably, it comprises a movable means capable of receiving optical radiation from different selected parts of the interior of the enclosure. The optical guiding means may comprise a reflector which reflects optical radiation along the said path. The reflector may be pivotally mounted and arranged to be tilted in either or both of two dimensions to give pan and tilt whereby optical radiation from a hemispherical region in front of the reflector may be guided along the said path. The reflector may for example comprise a prism. The reflector itself may be housed in an optically transparent containment or cover, eg a dome made of quartz, for example fitted into a receptacle in the passage.

The deflection means may comprise a reflector such as a mirror or prism. The photodetector is located in the path of deflected optical radiation, ie offset relative to the path through the said passage whereby the photodetector is located out of the direct path of any harmful radiation travelling along the said passage from the said enclosure. Such radiation is desirably arranged to be absorbed by the outer shield.

The optical radiation may be visible radiation emitted by lighting by one or more sources within the enclosure, eg from a sodium vapour source. The optical radiation could alternatively or in addition include infra-red radiation from a heat-emitting object.

The photodetector may be a known detector which detects the optical radiation falling upon it. The photodetector may comprise a conventional optical photographic camera, the optical image being detected on a film inside the camera. The photodetector may alternatively comprise a device by which the optical image is detected electronically. The device may comprise a multi-element or scanned photodetector array, eg a charge coupled device (CCD) detector for example contained in a conventional video camera. The device may alternatively comprise a thermionic tube assembly providing a known vidicon camera.

The present invention unexpectedly and beneficially allows a scene inside a hazardous radioactive enclosure to be optically monitored with minimum ionising radiation shielding and therefore much more cheaply and conveniently than in the prior art by arranging the optical image to be guided to a photodetector located offset relative to the path of ionising radiation, eg gamma radiation, emitted from within the enclosure.

Also, because the photodetector by which optical images are detected in the invention is located on the outside of the main shield, (but may be inside a removable secondary outer shield or a removable cover) it is more conveniently accessible by human operators for servicing, replacement and fitting for connection to monitors (eg tv monitors) and does not have to satisfy stringent specifications. Where enhanced image definition and resolution is required simple replacement of conventional cameras with high definition CCTV device is facilitated.

The beam of optical radiation guided along the said passage may be passed through a plurality of lenses located in the said passage which ensure that the beam is guided onto the deflection means. The lenses may for instance comprise a field lens followed (in the direction of travel of the radiation) by one or more relay lenses. The passage diameter reducing elements may conveniently be located at an optical plane between relay lenses.

Focusing of the beam of radiation deflected by the deflection means may be focused by one or more further lenses, eg a lens having a fixed focal length or a zoom lens assembly. A zoom lens assembly provides adjustable control of the size of the field of view observed for each position of the guiding means.

A zoom lens assembly may alternatively be provided in the said passage. For example, optical radiation directed along the said passage by the guiding means may be incident on such an assembly directly after the guiding means. In this case, as in the prior art arrangements, the zoom lens assembly is located near to the sources of harmful radiation in the enclosure and needs to be suitably radiation hardened.

BRIEF DESCRIPTION OF THE DRAWINGS

An embodiment of the present invention will now be described by way of example with reference to the accompanying drawing, in which.

DETAILED DISCUSSION OF PREFERRED EMBODIMENTS

Figure 1:
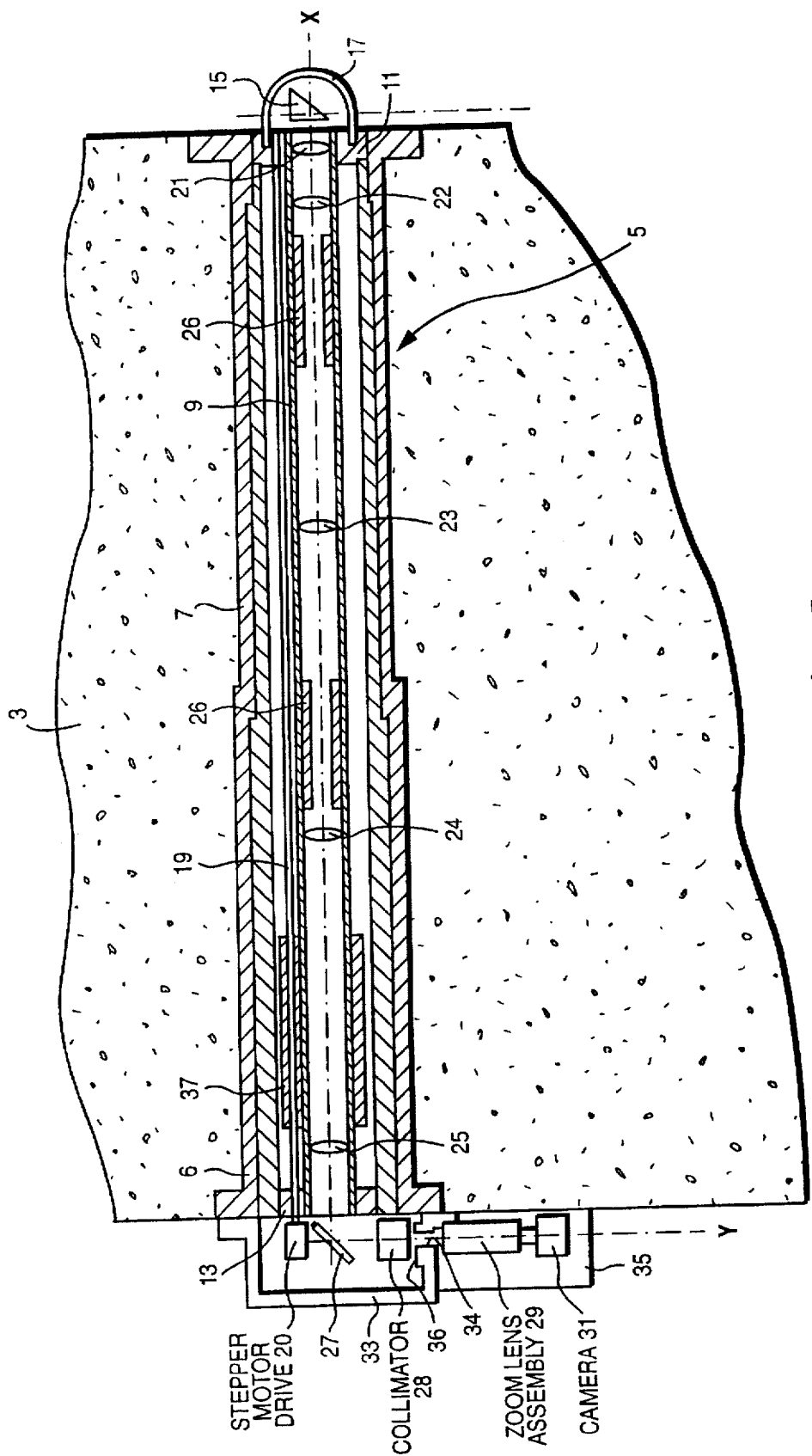
FIG. 1 is a transverse cross-sectional view of a shield wall and an arrangement for optically monitoring the interior of a shielded enclosure bounded by the wall.

In FIG. 1 a shielded enclosure 1 is bounded by a concrete ionising radiation shield which includes a wall 3 having an arrangement 5 fitted in a passage through the wall 3. The arrangement 5 comprises metallic liner 6 cast in the wall of the passage inside which is fitted a metallic tube 7 co-axially housing a narrower tube 9. A ring 11 locates the tubes 7, 9 together at their inner end and a spacer ring 13 holds them apart at their outer end. A reflective prism 15 is mounted at the inner end of the arrangement 5 on the axes of the tubes shows as common axis x in FIG. 1.

A protective quartz dome 17 is fitted over the prism 15 to enclose it in the space between the dome 17 and ring 11. The prism 15 and dome 17 are fixed to the ring 11, the prism 15 being mounted in such a way that it can be moved in two dimensions to give pan and tilt about the axis X. Control of the movement of the prism 15 is achieved in a known way by control shafts 19 (one shown) fitted through the space between the tubes 7, 9. The shafts 19 are connected at their outer end (ie end remote from the enclosure 1) to a stepper motor drive 20 for moving the prism 15 in incremental steps.

In an alternative arrangement (not shown), control of the movement of the prism 15 is achieved by control signals fed along suitable leads fitted through the space between the tubes 7, 9. The leads are connected at their inner end (ie end nearer to the enclosure 1) to a known drive mechanism eg a stepper motor drive for moving the prism in incremental steps. The outer ends of the leads are connected to a controlling device, eg a computer controlled pulse generator, located remote from the enclosure 1.

The tube 9 has fitted therein in sequential order from its inner end to its outer end optical lenses comprising a field lens assembly 21 located close to the prism 15, a first relay lens 22 and three further relay lenses 23, 24, 25. The distances between the relay lenses 22, 23, 24, 25 are equal and the number of relay lenses is dependent upon the length of the tube 9.

Located in the tube 9 and positioned between the relay lenses 22, 23 and the relay lenses 23, 24 are annular diameter reducing elements 26. These are made from lead (or some other suitable radiation attenuating material) and provide additional shielding to limit the amount of harmful radiation travelling through the tube 9 from the enclosure 1 to beyond the outer end of the tube 9. The elements 26 are positioned at an optical plane between the relay lenses 22, 23 and the relay lenses 23, 24 and the elements 26 are profiled such that they do not obstruct the path of optical radiation travelling along the tube 9 from the lens 15.

Additional lead radiation shielding 37 is provided in the space between the tubes 7, 9.

A mirror 27 is located beyond the tube 9 at its outer end on the axis X at an angle of 45° C. to the axis X. Light is reflected by the mirror 27 from the axis X along an axis Y through a collimator 28 and a zoom lens assembly 29 onto the photodetector of a closed circuit ccd tv camera 31.

The mirror 27 and the collimator 28 are housed within an outcell shield 33 of shielding material, eg lead, suitable to absorb harmful radiation passing along the axis X from the enclosure 1, eg gamma radiation, beta rays or neutrons. The assembly 29 and the camera 31 are located outside the outcell shield 33 but are enclosed within an environmental cover 35 which prevents extraneous optical radiation falling upon the camera 31.

In an alternative arrangement (not shown) the mirror 27, collimator 28, assembly 29 and camera 31 are all housed within an outcell shield.

In use, the optical scene inside the enclosure 1 is scanned by controlled tilting and panning of the prism 15. For each angular position of the prism 15 an optical beam from the viewed portion of the scene is guided by the prism along the axis X. The beam is passed through the lenses 21, 22, 23, 24 and 25 and thereby directed onto the mirror 27 by which it is deflected through the collimator 28 and focused by the lens assembly 29 onto the camera 31. The beam passes through the shield 33 to the lens assembly 29 via a small aperture 34. The aperture 34 has a lip feature 36 which is present to substantially prevent any harmful radiation, internally reflected within the shield 33 from passing through the aperture 34. The images formed by the camera 31 represent the portions of the scene in the enclosure 1 being viewed by the prism 15. The images formed by the camera 31 may be viewed on a remote tv monitor (not shown) located outside the shield 33 and the cover 35.

The shield 33 prevents gamma or other harmful radiation from the enclosure 1 passing into the outer environment beyond the shield 33. The cover 35 prevents extraneous optical radiation falling upon the camera 31.

The liner 6 and the outer tube 7 have increased outer diameters toward their outer ends to absorb ionising radiation travelling through the passage incorporating the arrangement 5 by multiple reflections within the passage (rather directly than along the axis X).

We claim:

1. An arrangement for forming an optical image of the interior of an enclosure contained within a radiation shield, the enclosure being one in which remote handling operations are carried out on radioactive material and the shield having a passage therethrough from an outer end to an inner end at said enclosure, said shield having a thickness extending between the outer and inner ends of the passage, which arrangement includes at least adjacent to the inner end of the passage:

optical guiding means for guiding optical radiation from scenes within the enclosure along a path through the said passage, located at least adjacent to the outer end of the passage;

deflection means for deflecting optical radiation which has been guided along the said path; and a photodetector arranged outside the shielded enclosure and outside the radiation shield to receive optical radiation which has been deflected by the deflection means.

2. An arrangement as in claim 1 and wherein the shield comprises a concrete structure to protect the environment outside the enclosure from harmful radiation emitted by materials in the enclosure, the passage being formed through a wall, floor or roof of the concrete structure.

3. An arrangement as in claim 1 and wherein the region outside the passage beyond the outer end of the passage is itself contained within an outer radiation shield in which the deflection means is enclosed and a cover is provided to enclose the photodetector.

4. An arrangement as in claim 1 and wherein the region outside the passage beyond the outer end of the passage is itself contained within an outer radiation shield in which the deflection means and the photodetector are enclosed.

5. An arrangement as in claim 1 and wherein one or more passage diameter reducing elements are incorporated at suitable points along the passage to limit the amount of harmful radiation passing along the passage, the elements being positioned so as not to obstruct the optical radiation path.

6. An arrangement as in claim 1 and wherein the optical guiding means comprises a fixed or movable means.

7. An arrangement as in claim 6 and which includes within said optical guiding means a movable means capable of receiving optical radiation from different selected parts of the interior of the enclosure.

8. An arrangement as in claim 1 and wherein the optical guiding means comprises a reflector which reflects optical radiation along the said path.

9. An arrangement as in claim 8 and wherein the reflector is pivotally mounted and arranged to be tilted in either or both of two dimensions to give pan and tilt whereby optical radiation from a hemispherical region in front of the reflector may be guided along the said path.

10. An arrangement as in claim 8 and wherein the reflector comprises a prism, the reflector itself being housed in an optically transparent containment or cover.

11. An arrangement as in claim 1 and wherein the deflection means comprises a reflector.

12. An arrangement as in claim 1 and wherein one or more lenses are located in the path of optical radiation in the said passage.

13. An arrangement as in claim 1 and wherein an adjustable zoom lens assembly is located between the deflection means and the photodetector.

14. An arrangement as in claim 1 and wherein an adjustable zoom lens assembly is located in the said passage adjacent to the said guiding means.

15. An arrangement for forming an optical image of the interior of an enclosure contained within a radiation shield, the enclosure being one in which remote handling operations are carried out on radioactive material and the shield having a passage therethrough from an outer end to an inner end at the said enclosure, which arrangement includes at least adjacent to the inner end of the passage:
 optical guiding means for guiding optical radiation from scenes within the enclosure along a path through the said passage, located at least adjacent to the outer end of the passage; and
 a photodetector arranged outside the shielded enclosure and outside the radiation shield to receive optical radiation which has been guided by the optical guiding means, said optical guiding means comprising a reflector which reflects optical radiation along said path, wherein said reflector is pivotally mounted and is capable of tilting in at least one of two directions to give pan and tilt whereby optical radiation from a hemispherical region in front of the reflector may be guided along said path.

16. An arrangement as in claim 15, wherein the region outside and beyond the outer end of the passage is itself contained within an outer radiation shield in which a cover is provided to enclose the photodetector.

17. An arrangement as in claim 15 and wherein at least one passage diameter reducing element is incorporated at a suitable point along the passage to limit the amount of harmful radiation passing along the passage, the at least one element being positioned so as not to obstruct the optical radiation path.

18. An arrangement as in claim 15, wherein at least one lens is located in the path of optical radiation in the passage.

19. An arrangement as in claim 15, wherein an adjustable zoom lens assembly is located between the outer end of the passage and the photodetector.

20. An arrangement as in claim 15 and wherein an adjustable zoom lens assembly is located in the said passage adjacent to the said guiding means.

* * * * *